US009228640B2

(12) United States Patent
Ohm et al.

(10) Patent No.: US 9,228,640 B2
(45) Date of Patent: Jan. 5, 2016

(54) TRANSMISSION ASSEMBLIES

(75) Inventors: Timothy R. Ohm, Grover Beach, CA (US); Mark Robert Claffee, Methuen, MA (US); Martin Buehler, Watertown, MA (US); David Brancazio, Cambridge, MA (US)

(73) Assignee: iRobot Corporation, Bedford, MA (US)

( * ) Notice: Subject to any disclaimer, the term of this patent is extended or adjusted under 35 U.S.C. 154(b) by 1160 days.

(21) Appl. No.: 13/158,365

(22) Filed: Jun. 10, 2011

(65) Prior Publication Data

US 2012/0053000 A1  Mar. 1, 2012

Related U.S. Application Data

(60) Provisional application No. 61/353,397, filed on Jun. 10, 2010.

(51) Int. Cl.
*F16H 3/54* (2006.01)
*F16H 57/08* (2006.01)
*B25J 9/10* (2006.01)

(52) U.S. Cl.
CPC . *F16H 3/54* (2013.01); *B25J 9/102* (2013.01); *F16H 57/08* (2013.01); *F16H 2200/0034* (2013.01); *F16H 2200/2005* (2013.01); *F16H 2200/2035* (2013.01)

(58) Field of Classification Search
CPC ............. F16H 3/54; F16H 3/76; F16H 57/08; B25J 9/102
USPC ......... 475/154, 298, 299, 317, 320, 321, 322, 475/150
See application file for complete search history.

(56) References Cited

U.S. PATENT DOCUMENTS

| 1,239,541 | A | * | 9/1917 | Thomas | 475/155 |
| 1,274,781 | A | * | 8/1918 | Rathburn | 475/154 |
| 2,865,232 | A | * | 12/1958 | Nardone | 475/156 |
| 4,592,251 | A | * | 6/1986 | Mason | 475/157 |
| 5,151,068 | A | * | 9/1992 | Mann et al. | 475/322 |
| 7,357,751 | B2 | * | 4/2008 | Kleinmann et al. | 475/317 |
| 8,517,889 | B2 | * | 8/2013 | Misala | 475/322 |

FOREIGN PATENT DOCUMENTS

DE  19917673 A1 * 10/2000

* cited by examiner

*Primary Examiner* — Robert Hodge
*Assistant Examiner* — Terry Chau
(74) *Attorney, Agent, or Firm* — Myers Bigel Sibley & Sajovec (57) ABSTRACT

A transmission assembly comprises: a motor; a shift actuator mechanism coupled to the motor; a sun gear coupled to an output shaft of the motor; a first magnet assembly coupled to the sun gear; a ring gear assembly coupled to a shift coupler, the shift coupler being configured to engage via the shift actuator mechanism; a second magnet assembly coupled to a housing face plate, the housing face plate being coupled to an output gear box; and a planet carrier coupled to an output pinion in communication with the output gearbox. The planet carrier comprises at least one planet gear. In a first mode, the ring gear is locked to the first magnet assembly and configured to rotate with the sun gear, the ring gear being configured to prevent the rotation of the at least one planet gear about its own axis causing the planet carrier to rotate at the same speed as the sun gear. In a second mode, the ring gear is locked to the second magnet assembly allowing the sun gear to engage the at least one planet gear, the sun gear being configured to rotate the at least one planet gear about its own axis causing the planet carrier to rotate at a reduced speed from the sun gear.

13 Claims, 8 Drawing Sheets

TRANSMISSION ASSEMBLIES

INTRODUCTION

This application claims priority to U.S. Provisional Patent Application Ser. No. 61/353,397, filed Jun. 10, 2010, titled Transmission Assemblies, the entire content of which is incorporated by reference herein.

The present teachings relate generally to transmission assemblies. More specifically, the present teachings relate to automatic, two-speed transmission assemblies for small motors, such as, for example, electric, gas, or hydraulic motors integrated with robotic joints.

BACKGROUND

The section headings used herein are for organizational purposes only and are not to be construed as limiting the subject matter described in any way.

A transmission or gearbox generally provides speed and torque conversions from a rotating power source, such as, for example, a motor, to another device using gear ratios. In large electric systems, such as, for example, electric vehicle drive trains, a transmission adapts the output of an electric motor to a vehicle's drive wheels. The transmission reduces a high motor speed to a slower wheel speed, increasing torque in the process. Transmissions generally have multiple gear ratios (or simply "gears"), with the ability to switch between gears ratios as the vehicle's speed varies.

Due to size and weight constraints, transmissions are typically not used in small electric systems (i.e., with small electric motors), such as, for example, robotic joints and small mobile robots. Because small motors are generally not capable of switching between gears, such devices are presently limited to a single torque output, generally being considered either strong and slow (i.e., with high torque and low speed), or weak and fast (i.e., with low torque and high speed).

It may, therefore, be desirable to provide a transmission assembly that is scalable to any size input motor, allowing for an increased dynamic output range (i.e., torque and speed range) in small electric systems, such as, for example, robotic joints. It also may be desirable to provide a transmission assembly that is able to reliably shift between drive-modes, in a fraction of an actuator time-constant, to optimize motor strength, speed, and efficiency. Furthermore, it may be desirable to provide a transmission assembly that provides failsafe operation, preventing transmission failure while passing through a neutral state.

SUMMARY

The present teachings may solve one or more of the above-mentioned problems and/or achieve one or more of the above-mentioned desirable features. Other features and/or advantages may become apparent from the description which follows.

The present teachings provide a transmission assembly for a remote vehicle. The transmission assembly comprises a motor and is able to shift between a first higher-torque lower-speed output operational state and a second lower-torque higher-speed output operational state at any time independent of a load on or a speed of the motor. The transmission assembly is configured to be stable within the first and second operational states, requiring no energy to maintain the first or second operational state. The transmission assembly is also configured not to fail when switching between the first and second operational states and to shift between the first and second operational states within a fraction of its assembly time constant because the transmission assembly passes through the neutral operational state quickly when switching between the first and second operational states. The transmission assembly is configured to absorb energy of the shifting process via a non-positive clutch.

The present teachings also provide a transmission assembly comprising: a motor; a shift actuator mechanism coupled to the motor; a sun gear coupled to an output shaft of the motor; a first magnet assembly coupled to the sun gear; a ring gear assembly coupled to a shift coupler, the shift coupler being configured to engage via the shift actuator mechanism; a second magnet assembly coupled to a housing face plate, the housing face plate being coupled to an output gear box; and a planet carrier coupled to an output pinion in communication with the output gearbox. The planet carrier comprises at least one planet gear. In a first mode, the ring gear is locked to the first magnet assembly and configured to rotate with the sun gear. The ring gear is configured to prevent the rotation of the at least one planet gear about its own axis, causing the planet carrier to rotate at the same speed as the sun gear. In a second mode, the ring gear is locked to the second magnet assembly allowing the sun gear to engage the at least one planet gear, the sun gear being configured to rotate the at least one planet gear about its own axis causing the planet carrier to rotate at a reduced speed from the sun gear.

Additional objects and advantages of the present teachings will be set forth in part in the description which follows, and in part will be obvious from the description, or may be learned by practice of the present teachings. The objects and advantages of the present teachings can be realized and attained by means of the elements and combinations particularly pointed out in the appended claims.

It is to be understood that both the foregoing general description and the following detailed description are exemplary and explanatory only and are not restrictive of the present teachings, as claimed.

The accompanying drawings, which are incorporated in and constitute a part of this specification, illustrate exemplary embodiments of the present teachings and together with the description, serve to explain the principles of those teachings.

DESCRIPTION

Reference will now be made in detail to exemplary embodiments of the present teachings, examples of which are illustrated in the accompanying drawings.

The present teachings relate to automatic, multi-speed transmission assemblies for small motors, such as, for example, motors on and/or integrated with a manipulator arm on a remote vehicle such as an iRobot® PackBot®. Two operational states, a weak/fast state comprising a low torque output and a high speed, and a strong/slow state comprising a high torque output and a low speed, can be achieved in accordance with the present teachings by utilizing a planetary gear-based, two-speed shifter comprising a sun gear, a ring gear, and a planet carrier comprising at least one planet gear. An actuator mechanism may be used to shift the ring gear between a first mode (e.g., a direct-drive mode) and a second mode (e.g., a low-gear mode). In the direct-drive mode, the ring gear is locked to and rotates with the sun gear. Thus, the planet carrier rotates at the same speed as the sun gear, providing a 1:1 input/output ratio. In the low-gear mode, the ring gear is locked to a fixed outer housing, allowing the sun gear to engage the at least one planet gear. Thus, the sun gear causes the at least one planet gear to rotate on its own axis, causing the planet carrier to rotate at a reduced speed, thereby providing a reduced input/output ratio. In various embodiments of the present teachings, a magnetic attraction can be used to maintain the sun gear's position within a respective drive mode.

While the embodiments described herein include a planet gear, the present teachings also contemplate using, for example, spur stages and dual planetary stages.

In various exemplary embodiments, transmission assemblies in accordance with the present teachings may be integrated with small mobile robots and/or robotic joints, such as, for example, manipulator arms on a remote vehicle such as an iRobot® PackBot®. Those of ordinary skill in the art would understand, however, that the transmission assemblies of the present teachings are scalable to any size input motor (i.e., any size of electric, hydraulic, or gas motor), allowing for an increased dynamic output range (i.e., torque and speed range) in various robotic systems, and are not intended to be limited in any way by the exemplary embodiments discussed above and below with regard to small robotic systems.

Figure 1:
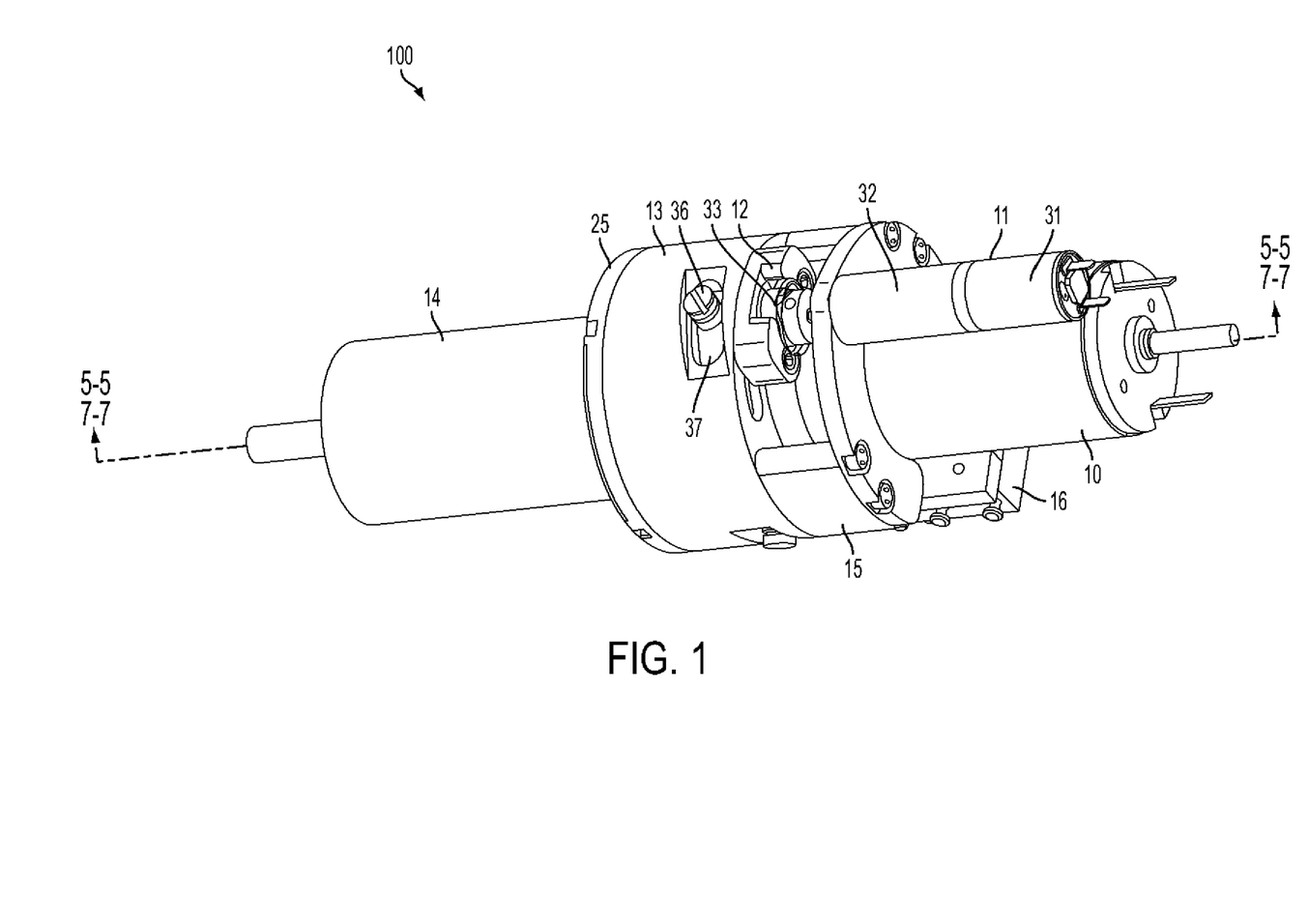
FIG. 1 is a perspective view of an exemplary embodiment of a transmission assembly in accordance with the present teachings.
Figure 2:
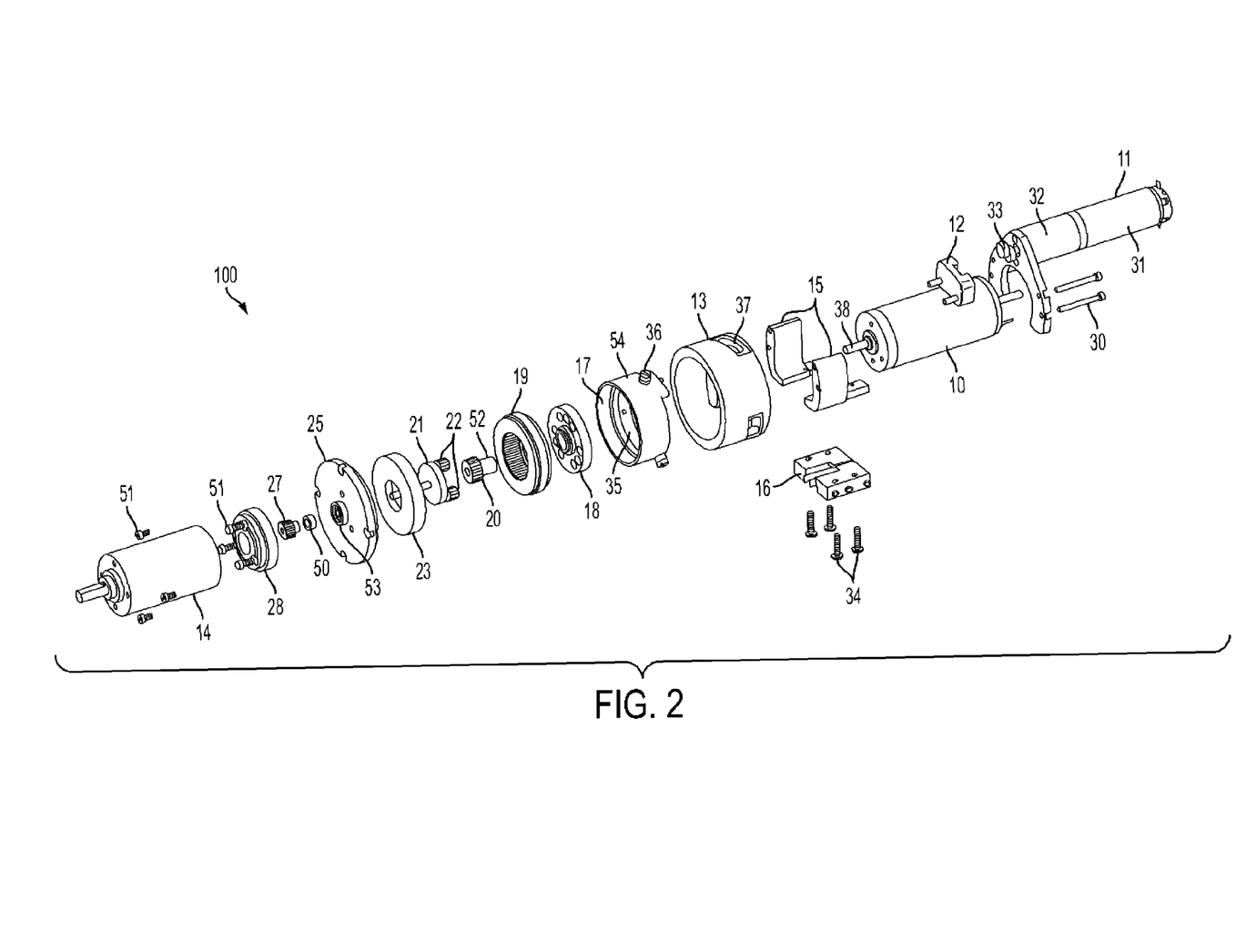
FIG. 2 is an exploded view of the transmission assembly embodiment of FIG. 1.

With reference now to FIGS. 1 and 2, a perspective view and an exploded view of an exemplary embodiment of a transmission assembly 100 are shown. The transmission assembly 100 comprises an electric motor 10, a shift actuator mechanism 11, a transmission housing 13, and an output gear box 14.

The shift actuator mechanism 11 comprises a shift cam 12, a shift motor 31, a gear head 32, and a cam bearing 33. As shown in FIG. 1, the shift actuator mechanism 11 is coupled to the electric motor 10 via the shift cam 12. In various embodiments, for example, the shift actuator mechanism 11 is secured to the transmission housing 13 via fasteners 30 (e.g., mounting screws and/or bolts shown in FIG. 2). The shift cam 12 may be mounted, for example, on an output shaft of the gear head 32 so that the cam bearing 33 is pressed into the shift cam 12. In various embodiments of the present teachings, for example, the cam bearing 33 may comprise a 0.25 inch outer diameter (OD) ball bearing. Those of ordinary skill in the art would understand, however, that the cam bearing 33 may comprise various sizes depending on a particular application. In various exemplary embodiments, the shift cam 12 may be secured to the gear head 32 via a set-screw (not shown). Those of ordinary skill in the art would also understand that the shift cam 12 may be secured to the gear head 32 using various fastening mechanisms, including, but not limited to, various types of screws, bolts, adhesives and/or welding mechanisms.

The gear head 32 may be mounted to the transmission housing 13 via brackets 15, which may also position a pair of shift verification limit switches 16 relative to a dowel pin (not shown) on a shift coupler 35 (see FIG. 2). In various exemplary embodiments of the present teachings, the shift verification limit switches 16 may comprise mechanical lever-style limit switches (e.g., contact sensors) that are used to detect the presence or position of the dowel pin. The gear head 32 may also be secured to the transmission housing 13, for example, via fasteners 30 (e.g., mounting screws and/or bolts shown in FIG. 2), and the shift verification limit switches 16 may be secured, for example, via fasteners 34 (e.g., mounting screws and/or bolts). Those of ordinary skill in the art would understand, however, that the gear head 32 and shift verification limit switches 16 may be secured using various fastening mechanisms, including, but not limited to, various types of screws, bolts, adhesives and/or welding mechanisms.

In various exemplary embodiments of the present teachings, the shift coupler 35 may comprise an inner half of a shift assembly 54. The shift coupler 35, for example, may be an aluminum part with several tapped holes and one or more raised bosses on one end. A shift yoke 17, comprising an outer half of the shift assembly 54, may be bolted to the shift coupler 35 on one of the bosses, and the dowel pin (not shown) may be pressed, for example, into a second boss. In various embodiments, for example, three tapped holes (not shown) may be spaced evenly around an outer surface of the shift assembly 54. In various additional embodiments, three shoulder screws with bearings 36 on their shoulders may be mounted in the three tapped holes. In various embodiments, for example, the bearings 36 may comprise 3/32 OD bearings (e.g., ball bearings). Those of ordinary skill in the art would understand, however, that various types, sizes, numbers, and/or configurations of holes, screws and/or bearings can be used without departing from the scope of the present teachings. Those of ordinary skill in the art would further understand that the shift coupler 35 and shift yoke 17 may be formed from various suitable strong materials, including, for example, a metal such as aluminum, as well as various other suitably strong and light materials.

The outer diameter of the shift assembly 54 is configured to fit within the transmission housing 13. In various embodiments, the transmission housing 13 may, for example, comprise helical slots 37. In an assembled state, bearings 36 are configured to be situated inside the helical slots 37 as shown in FIG. 1. Those of ordinary skill in the art would also understand that the transmission housing 13 may be formed from various materials, including, for example a metal such as aluminum, as well as various other suitably strong and materials.

Figure 4:
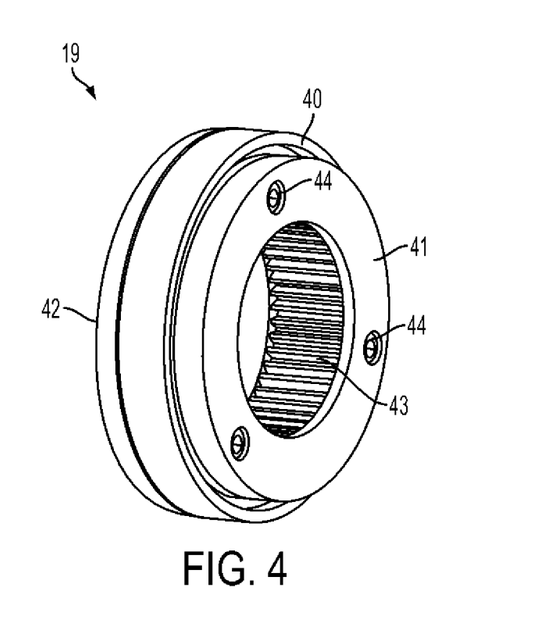
FIG. 4 is an enlarged view of a ring gear embodiment shown in FIG. 2.

With reference now to FIG. 2, a ring gear assembly 19 may be mounted within the transmission housing 13 via the shift coupler 35. As shown in FIG. 4, the ring gear assembly 19 may comprise a high aspect ratio bearing 40, a first ring gear flange 41, a second ring gear flange 42, and the ring gear 43. In various exemplary embodiments of the present teachings, the ring gear 43 may comprise, for example, a stainless steel part with approximately 48 teeth at a 64 diametral pitch (D.P.). Those of ordinary skill in the art would understand, however, that the ring gear may have various configurations (e.g., sizes, numbers of teeth, and/or pitches) and be formed from various materials including, for example, a metal such as steel, and that the configuration and material used for the ring gear 43 may be chosen as desired based on strength, efficiency, cost, the speed and load desired to be supported and other such design factors. In various exemplary embodiments, flanges 41 and 42 may comprise carbon steel rings. Flanges 41 and 42 may also be formed from various conductive materials, including, for example, magnetic steel, iron and/or nickel. The material used may be chosen as desired based on a desired conduction of magnetic flux and efficiency.

As also shown in FIG. 4, the ring gear 43 may be positioned between the ring gear flanges 41 and 42 so that the ring gear 43 is effectively held to the inner race of the high aspect ratio bearing 40 by the flanges 41 and 42. In various embodiments of the present teachings, fasteners 44 (e.g., screws and/or bolts) may lock the ring gear 43 to the flanges 41 and 42, thereby holding the ring gear assembly 19 together. Those of ordinary skill in the art would understand, however, that various types, numbers, and configurations of fasteners, adhesives or welding mechanisms can be used to hold the ring gear 43 within the flanges 41 and 42 without departing from the scope of the present teachings.

The outer race of the high aspect ratio bearing 40 may be glued, friction fit, or otherwise fastened to an inner shoulder of the shift coupler 35. Thus, the ring gear assembly 19 may spin freely within the shift coupler 35, but is constrained axially by the shift coupler 35.

With reference to FIG. 2, a sun gear 20 is configured to be coupled to an output shaft 38 of the electric motor 10. In various embodiments, for example, the sun gear 20 may be molded, glued or otherwise adhered via a shank 52 to the output shaft 38. In various exemplary embodiments, the sun gear 20 may comprise a stainless steel part with approximately 24 teeth at 64 D.P. Those of ordinary skill in the art will understand, however, that the sun gear 20 may have various configurations and be formed from various metal materials, including, for example, steel, and that the configuration and material used for the sun gear 20 may be chosen as desired based on the planet carrier design, strength, efficiency, the speed and load desired to be supported, and other design factors.

A first magnet assembly 18 is configured to be coupled to the sun gear 20. In various embodiments, the first magnet assembly 18 may be, for example, glued or otherwise adhered or fastened to the shank 52 of the sun gear 20 in a non-rotatable manner. The first magnet assembly 18 may, therefore, rotate at the same speed as the electric motor 10. A second magnet assembly 23 may be coupled to a housing face plate 25. In various embodiments, the second magnet assembly 23 may be fastened (e.g., screwed and/or bolted), adhered, or welded in a non-rotatable manner to the stationary face plate 25, thereby effectively preventing rotation of the second magnet assembly 23.

Upon assembly of the transmission, the magnet assemblies 18 and 23 comprise a cylindrical, cup-shaped magnet housing configured to enclose a magnet carrier. In an exemplary embodiment, each magnet carrier can be configured to hold, for example, up to about twelve magnets. In various exemplary embodiments of the present teachings, magnet assemblies 18 and 23 may each comprise three Ne—Fe—B magnets. Those of ordinary skill in the art would understand, however, that a variety of configurations, types and/or numbers of magnets may be used depending on a particular application and/or a required torque output. Those of ordinary skill would also understand that the magnet assemblies may be formed from various conductive materials, including, for example, carbon steel, iron and/or nickel, and that the materials used may be chosen as desired based on a desired conduction of magnetic flux, efficiency, and other design factors.

Figure 3:
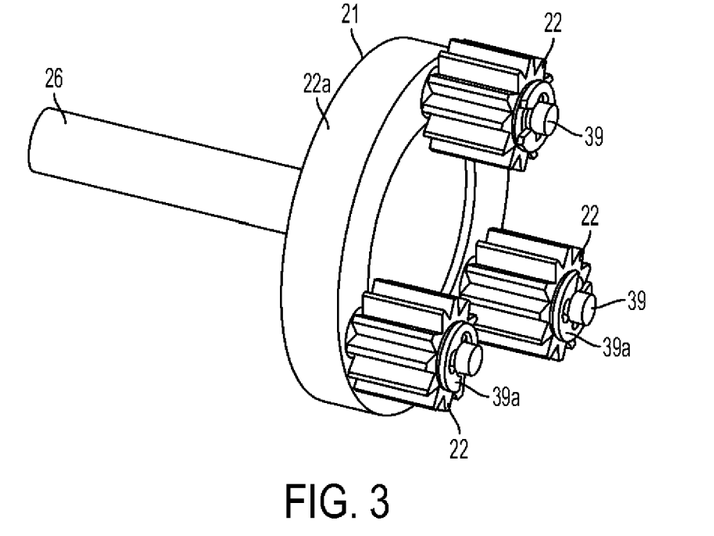
FIG. 3 is an enlarged view of a planet carrier embodiment shown in FIG. 2.

A planet carrier 21 may comprise at least one planet gear 22 and an output shaft 26. As shown in FIG. 3, in various exemplary embodiments of the present teachings, the planet carrier 21 may comprise multiple planet gears 22, such as, for example, three planet gears 22. In various embodiments, a planet gear 22 may comprise stainless steel, include approximately 12 teeth at 64 D.P., and be configured to mesh with the ring gear 19. As above, those of ordinary skill in the art would understand, however, that one or more planet gears 22 can be utilized and may have various configurations (e.g., sizes, numbers of teeth, and/or pitches) and be formed from various materials, including, for example, steel and/or plastic, and that the configuration and materials used for the planet gears 22 may be chosen as desired based on strength, efficiency, the speed and load desired to be supported and other such factors.

In various exemplary embodiments, the planet gears 22 may be mounted to a base portion 22a via securement to posts 39 using, for example, rings 39a. The output shaft 26 of the planet carrier 21 may rotate inside a pair of bearings 53 (e.g., ball bearings) that can be mounted within the housing face plate 25, and be coupled to an output pinion 27. A spacer 50 (see FIG. 2) can be provided to ensure proper spacing between the bearings 53 and the output pinion 27. In various embodiments, for example, the output shaft 26 may be glued or otherwise adhered to the output pinion 27. The output pinion 27 is configured to form the input to a first reduction stage of an output gear box 14. As shown in FIG. 1, the transmission housing 13 may be secured to the electric motor 10 on one side (e.g., via fasteners 30 as discussed above) and an output gear box 14 on the other side (e.g., via the housing face plate 25, an output gear box coupler 28, and fasteners 51 (e.g., screws and/or bolts as shown in FIG. 2)).

As would be understood by those of ordinary skill in the art, in operation, the shift motor 31 may be driven in either direction to drive the cam bearing 33. The cam bearing 33 may interact with the shift cam 12 to cause the shift coupler 35 to rotate until a dowel pin trips one of the shift verification limit switches 16, shutting down or stopping the shift motor 31 (i.e., upon completion of a shift between modes). To shift modes, the shift motor direction may then be reversed, rotating the shift coupler 35 in the opposite direction until another shift verification limit switch 16 is tripped. Interaction of the bearings 36 and the helical slots 37 can translate rotary motion of the shift coupler 35 into axial motion of the transmission housing 13. This axial motion of the transmission housing 13 allows the transmission assembly 100 to change states between a first mode and a second mode, by moving the ring gear assembly 19 back and forth between the magnet assemblies 18 and 23. Causing the ring gear 43 of the ring gear assembly 19 to move between a first position and second position causes the transmission 100 to change modes.

Figure 5:
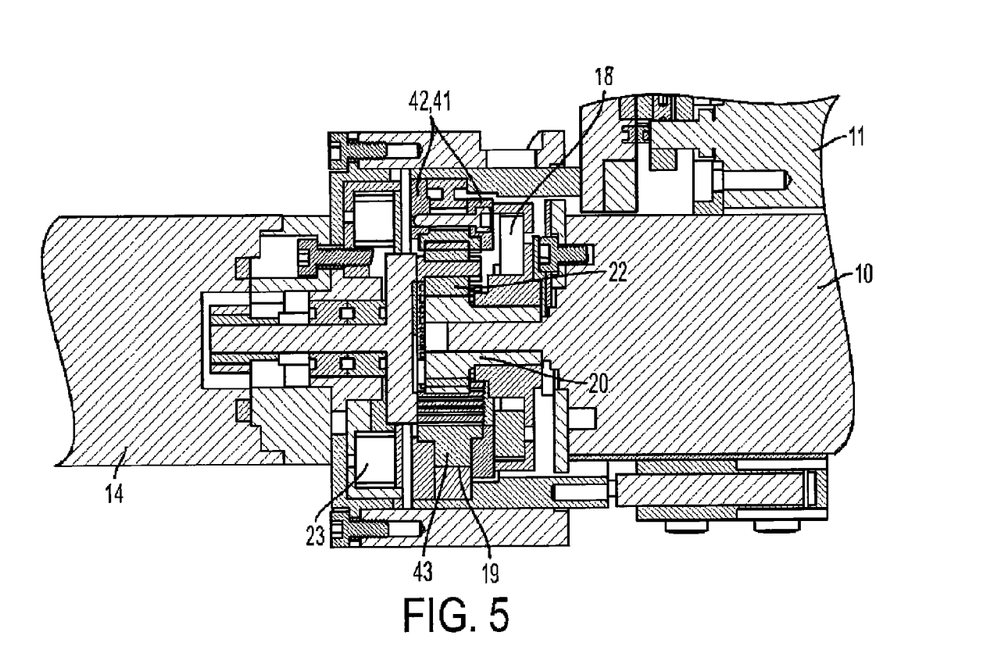
FIG. 5 is a partial cross-sectional view of the transmission assembly of FIG. 1 in a first mode, taken through line 5-5 in FIG. 1.

As shown in FIG. 5, in a first mode (i.e., a direct-drive mode), the ring gear assembly 19 may engage the first magnet assembly 18 via, for example, a friction lock between the first ring gear flange 41 and the first magnet assembly 18. Thus, because the sun gear 20 is non-rotatably coupled to the first magnet assembly 18, in the first mode, the ring gear 43 is locked to, and rotates with, the sun gear 20. Because, in this position, the ring gear 43 is configured to directly engage the planet gears 22 (i.e., along an outer periphery of the planet gears 22), the planet carrier 21 is configured to rotate at the same speed as the ring gear 43 (i.e., at the same speed as the sun gear 20). Thus, because the sun gear 20 rotates at the same speed as the electric motor 10 (i.e. the sun gear 20 is mounted to the output shaft 38 of the electric motor 10), the first mode provides a 1:1 input/output ratio (i.e., the output speed provided by the planet carrier 21 to the output gear box 14 is the same as the speed of the electric motor 10). Thus, the output gear box 14 is directly driven at the same speed as the electric motor 10, providing a relatively fast rotational speed output and a relatively low rotational torque output (i.e., the same speed and torque as the electric motor 10).

Figure 7:
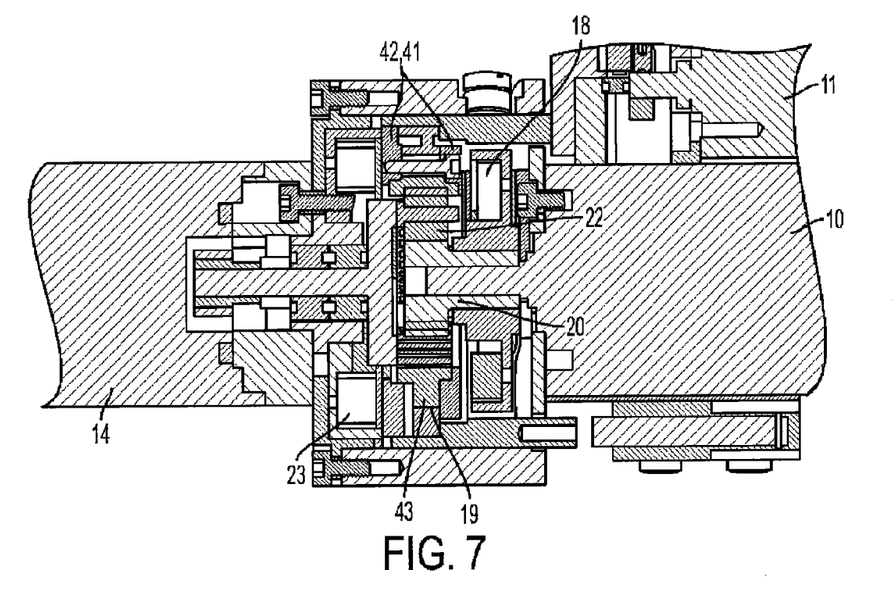
FIG. 7 is a partial cross-sectional view of the transmission assembly of FIG. 1 in a second mode, taken through line 7-7 in FIG. 1.

As shown in FIG. 7, in a second mode (i.e., a low-gear mode), the ring gear assembly 19 may engage the second magnet assembly 23 via, for example, a friction lock between the second ring gear flange 42 and the second magnet assembly 23. Because the second magnet assembly 23 is coupled to the fixed housing plate 25, in the second mode, the ring gear 43 is effectively locked to the fixed housing plate 25. In this position, the ring gear 43 is prevented from engaging the planet gears 22, and the sun gear 20 is instead configured to directly engage the planet gears 22 (i.e., within an inner periphery of the planet gears 22), causing the planet gears 22 to rotate on their own axes. Because the planet gears 22 rotate on their own axes, the rotational motion of the sun gear 20 is distributed between multiple gears. Thus, in this mode, the planet carrier 21 is configured to rotate at a reduced speed from the sun gear 20.

Using the exemplary embodiment of three planet gears 22, as described above and illustrated in FIGS. 2 and 3, the reduction ratio may be 3:1 (i.e., the output speed provided by the planet carrier 21 to the output gear box 14 is reduced by a magnitude of 3 due to the rotation of the three planet gears on their own axes, as compared to the input speed provided by the electric motor 10). Thus, the output gear box 14 is driven at a lower speed (i.e., a low-gear speed) as compared with the electric motor 10, providing a relatively slow rotational speed output and a relatively high rotational torque output (i.e., relative to electric motor 10).

Figure 6A:
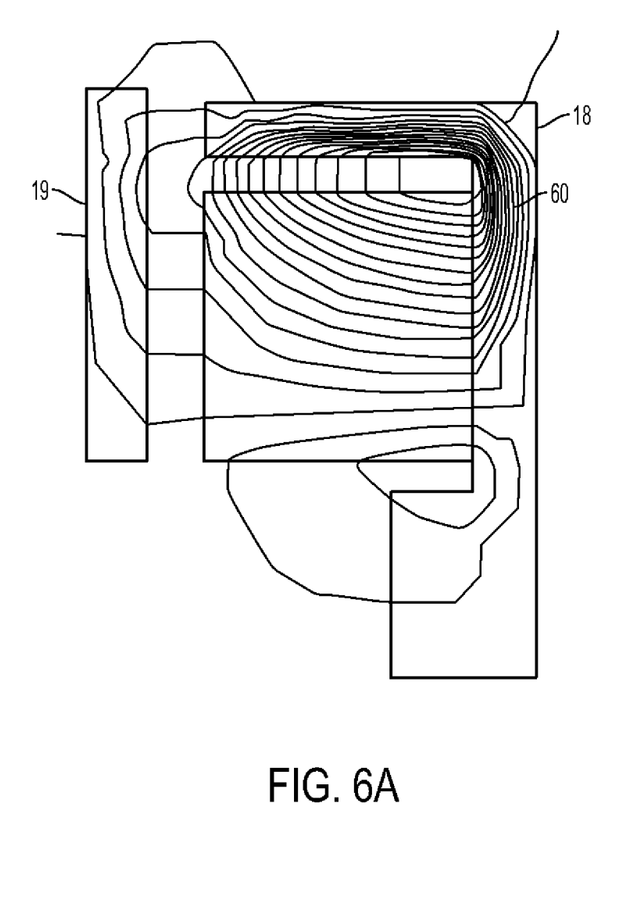
FIGS. 6A and 6B illustrate a series of magnetic flux density plots for an exemplary transmission assembly having a configuration like that in FIG. 5.
Figure 6B:
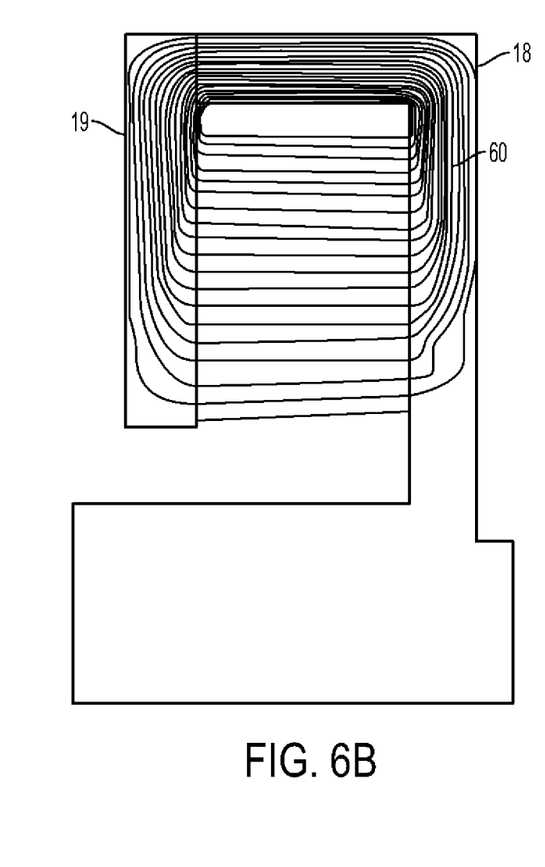

As shown in FIGS. 6A and 6B and FIGS. 8A and 8B, once the ring gear assembly 19 moves past a center point between the magnet assemblies 18 and 23, it can lock into place adjacent a respective magnet assembly 18, 23, due to a magnetic attraction of a more closely situated magnet assembly (i.e., FIGS. 6A and 6B and 8A and 8B show the ring gear assembly 19 "snapping into gear"). FIGS. 6A and 6B illustrate a series of magnetic flux density plots for an exemplary transmission assembly having the configuration illustrated in FIG. 5 (i.e., shifting into the first mode). As shown in FIG. 6A, while the ring gear assembly 19 is separated from the first magnet assembly 18, the magnetic flux lines 60 are relatively dispersed (i.e., illustrating a weak magnetic field strength). As shown in FIG. 6B, however, once the ring gear assembly 19 moves past a center point it locks into place, as evidenced by the now concentrated magnetic flux lines 60 (i.e., illustrating a strong magnetic field strength) between the ring gear assembly 19 and the first magnet assembly 18.

Figure 8A:
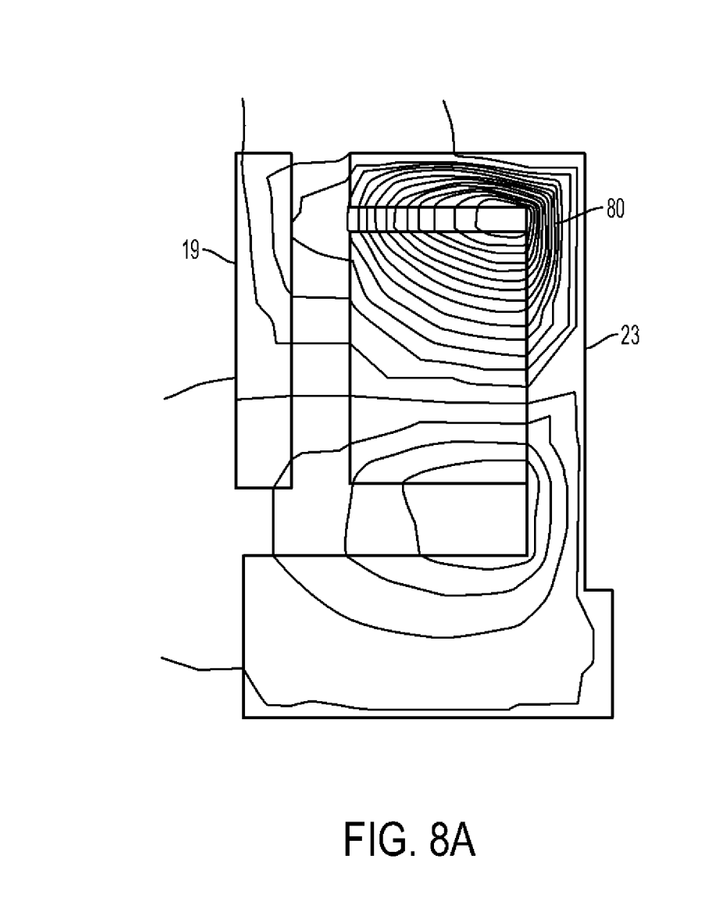
FIGS. 8A and 8B illustrate a series of magnetic flux density plots for an exemplary transmission assembly having a configuration like that in FIG. 7.
Figure 8B:
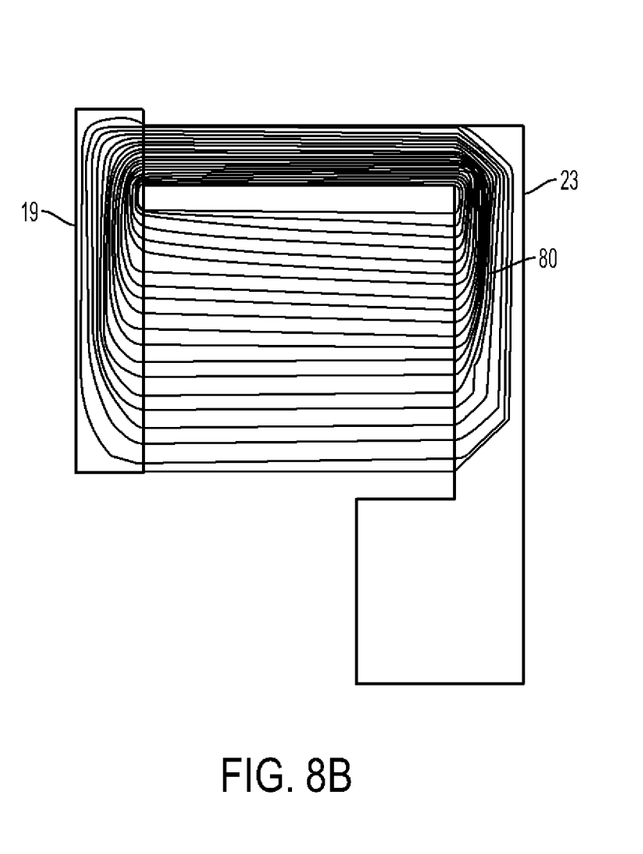

Similarly, FIGS. 8A and 8B illustrate a series of magnetic flux density plots for an exemplary transmission assembly having the configuration illustrated in FIG. 7 (i.e., shifting into the second mode). As shown in FIG. 8A, while the ring gear assembly 19 is separated from the second magnet assembly 23, the magnetic flux lines 80 are relatively dispersed (i.e., illustrating a weak magnetic field strength). As shown in FIG. 8B, however, once the ring gear assembly 19 moves past a center point it locks into place, as evidenced by the now concentrated magnetic flux lines 80 (i.e., illustrating a strong magnetic field strength) between the ring gear assembly 19 and the second magnet assembly 23. Consequently, as illustrated in FIGS. 6A and 6B and FIGS. 8A and 8B, the transmission assembly 100 can provide failsafe operation, preventing transmission failure while the ring gear assembly 19 passes through a neutral state. In other words, the ring gear assembly 19 will always be locked in either the first or second drive mode due to a strong magnetic field strength between the ring gear assembly 19 and the first magnet assembly 18 (i.e., the first mode), and a strong magnetic field strength between the ring gear assembly 19 and the second magnet assembly 23 (i.e., the second mode). Accordingly, as the ring gear assembly 19 moves back and forth via the shift actuator mechanism, the magnetic fields will prevent the ring gear assembly 19 from remaining in a neutral state between modes.

The present teachings contemplate use of other types of clutches in addition or alternative to the illustrated magnetic clutch, and preferably utilize non-positive clutches. Non-positive, as used herein, includes a clutch that engages via friction rather than, for example, gear teeth, such that energy of a shift can be absorbed by temporary slipping of the clutch friction surfaces. The magnetic clutches used herein are considered to have such non-positive friction surfaces.

Mechanical devices such as a transmission assembly in accordance with the present teachings have a "time constant" which can be defined by the time it takes the device to react to a change in its state or operating condition (e.g., getting up to speed after being turned on, accommodating an increased load, shifting between states, etc.). In accordance with certain standards, the time constant can be defined by the time it takes a motor to come up to a predetermined percentage (e.g., 63%) of its desired speed. Various embodiments of the present teachings contemplate having the magnetic clutch described herein pass through neutral (between the first and second operational states) almost instantaneously so that the device need not respond to neutral as a state to which it must adapt.

As discussed above, transmission assemblies in accordance with the present teachings are scalable to any size input motor, allowing for an increased dynamic output range (i.e., torque and speed range) in various small robotic systems, including, for example, robotic joints. To illustrate various principles of the present teachings and demonstrate how the transmission assemblies disclosed herein can be utilized to increase the dynamic output range of a robotic joint, such as, for example, a PackBot® manipulator arm joint, experiments were conducted on a test apparatus simulating a robotic arm, as shown and described with reference to FIG. 9.

Figure 9:
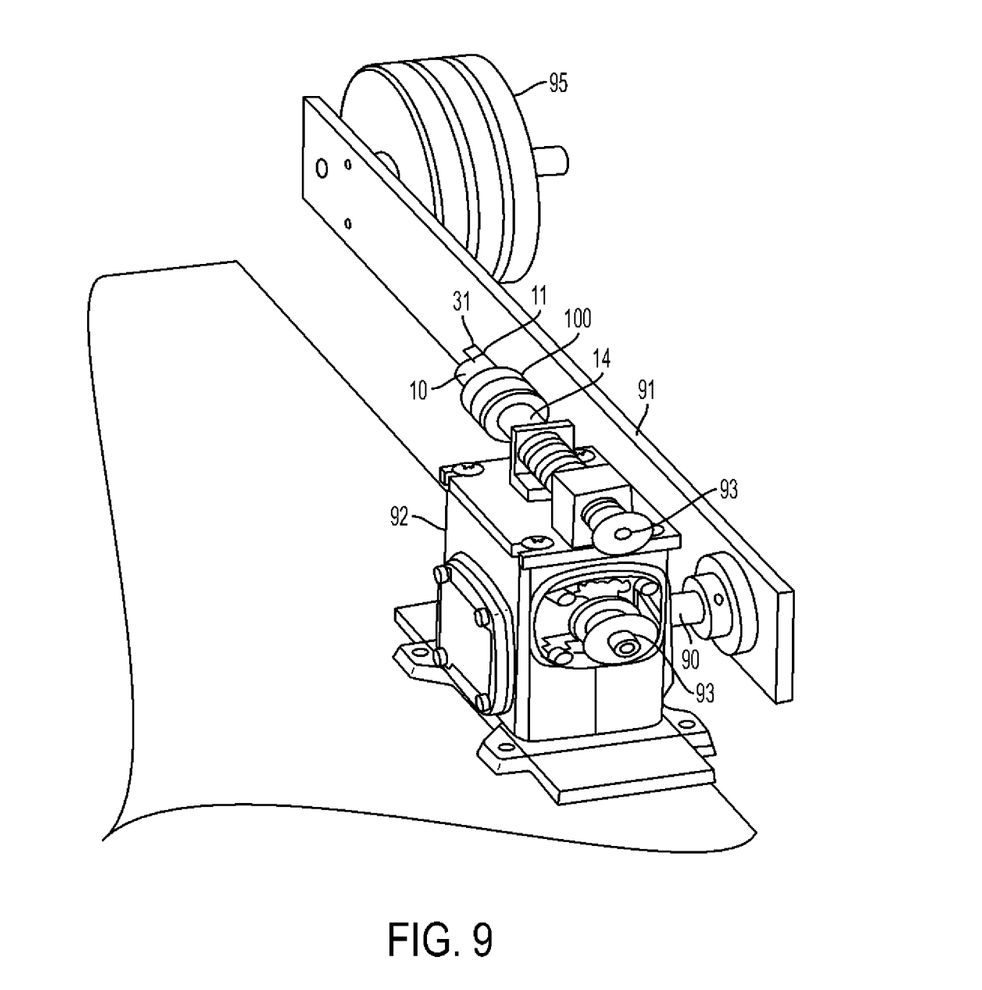
FIG. 9 is a perspective view of an exemplary embodiment of a transmission assembly integrated with a simulated robotic joint in accordance with the present teachings.

As shown in FIG. 9, a bench-top demo platform was developed to quickly and simply test the exemplary transmission assembly 100. The transmission assembly 100 was integrated with a joint 90 of a weight bearing arm 91 supporting standard workout weights 95. The joint 90 was attached to a gearbox 92. The gearbox 92 was a 40:1 right-angle, worm-gear drive, with a ⅝ inch diameter input shaft and a 1 inch diameter output shaft. Sprockets 93 for a ¼ inch chain (not shown) were used to transmit power from an output gearbox 14 of the transmission assembly 100 to the input shaft of the gearbox 92. A simple remote was fabricated with one DPDT switch to drive the electric motor 10 (i.e., the input motor to power the transmission assembly 100) in forward, off, or reverse, and a second DPDT switch was used to operate the shift motor 31 (i.e., the motor to power the shift actuator mechanism). The electric motor 10 was a RE25 motor, and the shift motor 31/gear head 32 combination was a Maxon RE16/GP16.

The exemplary transmission assembly 100 weighed about 133 grams with just the content of transmission housing 13, about 233 grams with the content of transmission housing 13 and the shift actuator mechanism 11, and about 360 grams with the content of transmission housing 13, the shift actuator mechanism 11, the electric motor 10 and the output gearbox 14.

In operation, the test apparatus ran and shifted smoothly between a first mode and a second mode. In the first mode (i.e., the direct-drive mode), the transmission assembly 100 provided increased speed with a low torque output. The assembly provided a joint speed of about 24 degrees/sec, which was at least 3 times that of a comparative PackBot® shoulder joint. In the second mode (i.e., the low-gear mode), the transmission assembly 100 provided reduced speed with a high torque output. The assembly provided a joint speed of about 8 degrees/sec with a max torque output of about 900 in-lbs (i.e., it could lift about 30 pounds on a 30 inch arm), which matched the speed and strength of a comparative PackBot® shoulder joint. Consequently, the transmission assembly 100 was shown to be able to increase the dynamic output range of a robotic joint as compared with the conventional PackBot® shoulder joint.

For the test apparatus, the planetary gear ratio selection was bound by various constraints: (1) a minimum reduction ratio of 3:1 (i.e., in the low-gear mode); (2) for the sun and planet gears, off-the-shelf tooth counts were used; (3) the ring gear's size was limited to keep the overall diameter manageable; and (4) gear ratios were generally bound by the following equations:

a) The number of sun gear teeth ($S$)+2*(the number of planet gear teeth ($P$))=the number of ring gear teeth ($R$);

b) The reduction ratio=$1+R/S$; and c) $S$/the number of planet gears=an integer value (i.e., so that the planet gear teeth may be distributed evenly).

Accordingly, for the test apparatus, the gear ratios were selected as R=48, S=24, and P=12, for an overall reduction ratio of 3:1, with three planet gears. Those of ordinary skill in the art would understand, however, that various gear configurations and/or gear ratios may be selected based on the above teachings for a given application.

Those of ordinary skill in the art would also understand that motor 10 (i.e., the drive motor) may comprise various types of motors, including, but not limited to, a Maxon RE25 electric motor, a hydraulic motor, a gas motor, etc. Those of ordinary skill in the art would further understand that shift motor 31 and gear head 32 may comprise various motor/gear head combinations, including, but not limited to, a Maxon RE10/GP10 or RE16/GP16 motor/gear head combination. It will be appreciated by those of ordinary skill in the art having the benefit of this disclosure that the present teachings provide transmission assembly embodiments for various small electric motors. Further modifications and alternative embodiments of various aspects of the present teachings will be apparent to those skilled in the art in view of this description. For example, although the particular examples and embodiments set forth herein contemplate using a shift motor 31 to shift between modes (i.e., shift between the first mode and the second mode), those of ordinary skill in the art would understand that various types of actuation methods may be utilized by the shift actuator mechanism 11 to shift modes. In various exemplary embodiments, for example, the shift actuator mechanism 11 may comprise an electromagnetic clutch actuator instead of the shift motor 31.

A transmission assembly in accordance with the present teachings can provide a small form factor transmission for electric motors that allows electric motor output to be switched among multiple operational states such as the above-described high-speed low-torque operational state and low-speed high-torque operational state.

Furthermore, the transmission assembly embodiments may include additional components that were omitted from the drawings for clarity of illustration and/or operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts may be reversed, and certain features of the present teachings may be utilized independently, all as would be apparent to one skilled in the art after having the benefit of the description herein. Changes may be made in the elements described herein without departing from the spirit and scope of the present teachings and following claims, including their equivalents.

It is to be understood that the particular examples and embodiments set forth herein are non-limiting, and modifications to structure, dimensions, materials, and methodologies may be made without departing from the scope of the present teachings.

For the purposes of this specification and appended claims, unless otherwise indicated, all numbers expressing quantities, percentages or proportions, and other numerical values used in the specification and claims, are to be understood as being modified in all instances by the term "about" if they are not already. Accordingly, unless indicated to the contrary, the numerical parameters set forth in the following specification and attached claims are approximations that may vary depending upon the desired properties sought to be obtained by the present teachings. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It should be understood that while the present teachings have been described in detail with respect to various exemplary embodiments thereof, it should not be considered limited to such, as numerous modifications are possible without departing from the broad scope of the appended claims, including the equivalents they encompass.

What is claimed is:

1. A transmission assembly for an electric motor of a remote vehicle, the transmission assembly comprising:
 an external housing portion that is movable along an axial direction of an output shaft of the electric motor between first and second axial positions at any time independent of a load on or a speed of the electric motor, wherein the transmission assembly is in a first higher torque lower speed output operational state when the housing portion is in the first axial position, and wherein the transmission assembly is in a second lower torque higher speed output operational state when the housing portion is in the second axial position;
a shift actuator mechanism coupled to the electric motor, a sun gear coupled to the output shaft of the motor;
a ring gear assembly coupled to a shift coupler, the shift coupler being configured to engage via the shift actuator mechanism;
a non-positive clutch configured to absorb energy of a shifting process, comprising:
  a first magnet assembly coupled to the sun gear; and
  a second magnet assembly coupled to a housing face plate, the housing face plate being coupled to an output gear box;
the transmission assembly being configured to be stable within the first and second operational states, requiring no energy to maintain the first or second operational state, and
the transmission assembly being configured not to fail when switching between the first and second operational states and to shift between the first and second operational states within a fraction of its assembly time constant because the transmission assembly passes through a neutral operational state quickly when switching between the first and second operational states.

2. The transmission assembly of claim 1, further comprising a planet carrier coupled to an output pinion in communication with the output gearbox, the planet carrier comprising at least one planet gear.

3. The transmission assembly of claim 2, wherein in the first operational state, the ring gear is locked to the first magnet assembly and configured to rotate with the sun gear, the ring gear being configured to prevent the rotation of the at least one planet gear about its own axis causing the planet carrier to rotate at the same speed as the sun gear.

4. The transmission assembly of claim 3, wherein in the second operational state, the ring gear is locked to the second magnet assembly allowing the sun gear to engage the at least one planet gear, the sun gear being configured to rotate the at least one planet gear about its own axis causing the planet carrier to rotate at a reduced speed from the sun gear.

5. A transmission assembly comprising:
a motor;
a shift actuator mechanism coupled to the motor;
a sun gear coupled to an output shaft of the motor;
a first magnet assembly coupled to the sun gear;
a ring gear assembly coupled to a shift coupler, the shift coupler being configured to engage via the shift actuator mechanism, wherein the ring gear assembly is movable along an axial direction of the output shaft of the motor;
a second magnet assembly coupled to a housing face plate, the housing face plate being coupled to an output gear box; and
a planet carrier coupled to an output pinion in communication with the output gearbox, the planet carrier comprising at least one planet gear,
wherein, in a first mode, the ring gear is in a first axial position and is locked to the first magnet assembly and configured to rotate with the sun gear, the ring gear being configured to prevent the rotation of the at least one planet gear about its own axis causing the planet carrier to rotate at the same speed as the sun gear, and
wherein, in a second mode, the ring gear is in a second axial position and is locked to the second magnet assembly allowing the sun gear to engage the at least one planet gear, the sun gear being configured to rotate the at least one planet gear about its own axis causing the planet carrier to rotate at a reduced speed from the sun gear.

6. The transmission assembly of claim 5, integrated with a robotic joint.

7. The transmission assembly of claim 5, wherein the transmission assembly is configured to be stable within the first and second modes, requiring no energy to maintain the first or second mode.

8. The transmission assembly of claim 7, wherein the transmission assembly is configured not to fail when switching between the first and second modes and to shift between the first and second modes within a fraction of its assembly time constant because the transmission assembly passes through the neutral operational state quickly when switching between the first and second modes.

9. The transmission assembly of claim 8, wherein the transmission assembly is configured to absorb energy of the shifting process via a non-positive clutch.

10. A transmission assembly comprising:
a motor;
a shift actuator mechanism coupled to the motor;
a sun gear coupled to an output shaft of the motor;
a first magnet assembly coupled to the sun gear;
a ring gear assembly coupled to a shift coupler, the shift coupler being configured to engage via the shift actuator mechanism, wherein the ring gear assembly is movable along an axial direction of the output shaft of the motor;
a second magnet assembly coupled to a housing face plate, the housing face plate being coupled to an output gear box; and
a planet carrier coupled to an output pinion in communication with the output gearbox, the planet carrier comprising at least one planet gear,
wherein the transmission assembly is integrated with a robotic joint,
wherein, in a first mode, the ring gear assembly is in a first axial position and locked to the first magnet assembly such that the transmission assembly provides a low torque output, and
wherein, in a second mode, the ring gear assembly is in a second axial position and locked to the second magnet assembly such that the transmission assembly provides a high torque output.

11. The transmission assembly of claim 10, wherein the transmission assembly is configured to be stable within the first and second modes, requiring no energy to maintain the first or second mode.

12. The transmission assembly of claim 11, wherein the transmission assembly is configured not to fail when switching between the first and second modes and to shift between the first and second modes within a fraction of its assembly time constant because the transmission assembly passes through the neutral operational state quickly when switching between the first and second modes.

13. The transmission assembly of claim 12, wherein the transmission assembly is configured to absorb energy of the shifting process via a non-positive clutch.

* * * * *